L. DE HOLCZER.
VEHICLE WHEEL TIRE AND RIM.
APPLICATION FILED MAR. 8, 1918.
1,323,457.
Patented Dec. 2, 1919.
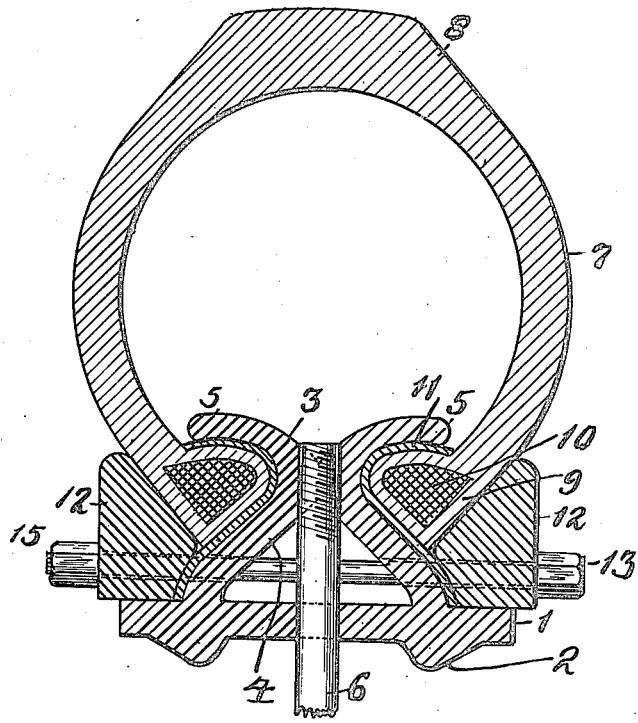
Inventor
Lewis De Holczer.
By C. E. Humphrey
Attorney

UNITED STATES PATENT OFFICE.

LEWIS DE HOLCZER, OF SIOUX CITY, IOWA.

VEHICLE-WHEEL TIRE AND RIM.

1,323,457.　　　　　　　Specification of Letters Patent.　　Patented Dec. 2, 1919.

Application filed March 8, 1918. Serial No. 221,165.

*To all whom it may concern:*

Be it known that I, LEWIS DE HOLCZER, a citizen of the United States, residing at Sioux City, in the county of Woodbury and State of Iowa, have invented new and useful Improvements in Vehicle-Wheel Tires and Rims, of which the following is a specification.

This invention has relation to improvements in pneumatic tires for vehicle wheels. The primary object of the invention is to provide an elastic tire for a vehicle wheel comprising a single casing capable of being inflated to render it sufficiently rigid and elastic for the use on the vehicle and in which the use of an inner inflatable tube or air bag is not necessary, thereby reducing the cost of the production of a tire of this type and obviating the constant danger of breakage or puncture of an inner tube which is commonly employed in tires of this general type.

More specifically the invention contemplates a special form of rim and a special form of tire casing or tire which is adapted to coact with the rim and form in connection therewith an air tight joint so that the casing may be inflated in the usual manner and be employed without an auxiliary or inner tube.

With the foregoing and other objects in view, the invention consists in the novel construction, combination and arrangement of parts constituting the invention to be hereinafter specifically described and illustrated in the accompanying drawing which forms a part hereof wherein is shown the preferred embodiment of the invention, but it is to be understood that changes, variations and modifications can be resorted to which come within the scope of the matter hereinafter claimed.

The drawing presented is a transverse section of a rim and tire embodying the present invention.

Referring to the drawing in detail the reference numeral 1 denotes a rim the inner face of which is provided with circumferential ribs 2 which are arranged to coact with a fixed or stationary felly band on the wheel to thereby render the entire device capable of easy removal. The outer face of the rim 1 is in the form of a cylinder and is provided with an outwardly extending circumferential centrally disposed triangular projection 3 comprising a pair of lateral walls 4 which converge toward each other and are formed integrally not only with the rim 1 but integrally with each other and at its apex the member 3 is formed with oppositely-disposed approximately straight tire retaining flanges 5. The flanges 5 project away from each other or are reversely disposed in exactly the opposite positions as are the clencher tire flanges now commonly employed. At a preferred point in the member 3 is a threaded opening to receive the outer end of a valve stem 6 by which the tire, to be later described, is inflated. Arranged to coöperate with the flanges 5 is a tire 7 provided with the usual tread 8 and with lateral circumferentially-extending beads 9 the inner opposing faces of which are arranged to approximately fit the lateral edges of the member 3 and engage under the overhanging flanges 5. The beads 9 are customarily provided with a stiffening or reinforcing element 10 which may be of any preferred construction. Interposed between the lateral faces of the member 3 and the beads 9 are strips 11 customarily formed of soft, resilient, vulcanized rubber to insure an air tight joint between the member 3 and the tire 7. The beads 9 are clamped against the packing strips 11 by means of two circumferentially-extending rings 12 which are seated on the outer face of the rim 1 and are suitably fashioned to engage the inclined outer faces of the tire beads for forcing them inwardly toward each other. These rings 12 are drawn toward each other through the medium of bolts 13 each provided at one end with a nut 15. The bolts 13 pass through the two walls 4 and are disposed around the tire at suitable and appropriate intervals. The tire is assembled by first covering the lateral faces of the member 3 and the inner side faces of the flanges 5 with packing strips 11 after which the beads 9 are inserted in position and the rings 12 seated on the rim after which the bolts 13 are positioned and the nuts 15 drawn up thereby securely clamping the beads against the packing strips 11 and form a substantially air tight joint between the flanges 5 and the beads 9. The tire is then inflated in the usual manner through the inflating tube and is ready for use.

The presence of the packing strips, 11, however, is arbitrary, for I have found that when the parts are so constructed and arranged that the surface of the beads is uniformly engaged by the walls, 4, the flanges, 5, and the rings, 12, said packing element is not essential to render the tire air-tight.

I claim,

In a device of the class described, a rim consisting of a band adapted to be mounted on a wheel, and having a central peripheral projection triangular in cross-section, oppositely-disposed and substantially straight flanges on the apex of the projection, a flexible tubular tire having an annular opening in its inner periphery, and provided with internal beads adjacent the opening, the exterior of the side portions of the tire adjacent the opening being inclined and flush with the sides of the tire, said beads, projection and flanges being so shaped and related that the surface of the beads will be uniformly engaged by the flanges and the sides of said projection by pressure on each side of the tire in the direction of the other side, rings adapted to be removably mounted on the band, the adjacent sides of the rings having inclined faces engageable with the exterior inclined sides of the tire adjacent the beads, and bolts extended transversely through said projection and the rings, operable to draw the rings, each toward the other.

In testimony whereof I have hereunto set my hand in presence of two subscribing witnesses.

LEWIS DE HOLCZER.

Witnesses:
 GEORGE W. GREENE,
 CHAS. F. SAWYER.